(12) United States Patent
Fantazi et al.

(10) Patent No.: US 7,866,765 B2
(45) Date of Patent: Jan. 11, 2011

(54) SPRING BRAKE ACCUMULATOR CYLINDER

(75) Inventors: Alain Fantazi, Dives sur mer (FR);
Franck Hemery, Honfleur (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 855 days.

(21) Appl. No.: 10/509,039

(22) PCT Filed: Mar. 21, 2003

(86) PCT No.: PCT/EP03/02972
§ 371 (c)(1),
(2), (4) Date: May 13, 2005

(87) PCT Pub. No.: WO03/080416
PCT Pub. Date: Oct. 2, 2003

(65) Prior Publication Data
US 2005/0199454 A1 Sep. 15, 2005

(30) Foreign Application Priority Data
Mar. 27, 2002 (DE) .................. 102 14 033

(51) Int. Cl.
*B60T 8/34* (2006.01)
(52) U.S. Cl. ............................ 303/127
(58) Field of Classification Search ............ 303/20, 303/4, 153 D, 153 R, 170, 92, 62, 63, 64, 303/127
See application file for complete search history.

(56) References Cited

U.S. PATENT DOCUMENTS

| 3,636,822 | A | | 1/1972 | Horowitz | |
|---|---|---|---|---|---|
| 3,878,925 | A | * | 4/1975 | Ignatoweicz | 188/206 R |
| 3,911,795 | A | * | 10/1975 | Gibbons | 92/63 |
| 4,850,263 | A | * | 7/1989 | Rumsey et al. | 92/63 |
| 5,205,205 | A | * | 4/1993 | Choinski et al. | 92/63 |
| 5,285,716 | A | * | 2/1994 | Thompson | 92/63 |
| 6,129,004 | A | | 10/2000 | Smith et al. | |

FOREIGN PATENT DOCUMENTS

| DE | 21 05 662 | 8/1972 |
|---|---|---|
| DE | 25 11 516 | 9/1975 |

(Continued)

OTHER PUBLICATIONS

Electric parking brake technology can integrate ABS. European Automotive Design. p. 77. Nov. 2000. Exact date unknown.*

(Continued)

*Primary Examiner*—Kelly Campen
*Assistant Examiner*—John O Preston
(74) *Attorney, Agent, or Firm*—Crowell & Moring LLP

(57) ABSTRACT

For the assembly of a spring-type brake cylinder, a rear cylinder is provided with a preloaded spring, with a rear piston and with an intermediate flange. Then, a front cylinder, in which a front piston with an actuating rod for a brake element of the braking system is movably arranged, is fixed to the rear cylinder, so that the rear cylinder and the front cylinder are in contact with one another by means of a sliding rod passing through the intermediate flange. As a result, the front piston is displaceable by the rear piston.

14 Claims, 3 Drawing Sheets

FOREIGN PATENT DOCUMENTS

| | | |
|---|---|---|
| DE | 30 41 110 A1 | 6/1982 |
| DE | 34 04 014 A1 | 8/1985 |
| DE | 200 21 393 U1 | 4/2001 |
| DE | 200 22 245 U1 | 7/2001 |
| DE | 101 09 515 A1 | 9/2001 |
| DE | 100 09 330 A1 | 10/2001 |
| GB | 1143036 | 2/1969 |

OTHER PUBLICATIONS

Captured Braking Energy Boosts Hybrid Truck Performance. Transport Topics. p. A18. Sep. 18, 2006.*
What's New in: Engine brakes. Fleet Owner. Marilyn Wilson. Jun. 2001. vol. 96, Issue 6. p. 78. Exact date unknown.*
N.N.: Small Roller, Sheet Metal, NC-Technologie Verlagsgesellschaft mbH & Co. Coburge, Issue No. 3, May 2000.

* cited by examiner

SPRING BRAKE ACCUMULATOR CYLINDER

BACKGROUND AND SUMMARY OF THE INVENTION

The invention relates to a pneumatic actuator for the braking system of a vehicle.

Pneumatic actuators of this type are often constructed as spring-type brake cylinders comprising a rear cylinder in which a rear piston is displaceably arranged. One side of the rear piston and the inner wall of the rear cylinder form a rear ventilation chamber. A preloaded spring, which can be compressed by the rear piston, is provided on the other side of the rear piston.

The rear ventilation chamber is sealed off by an intermediate flange traversed by a sliding rod resting against the rear piston. The sliding rod can be displaced in the intermediate flange by the rear piston. A front ventilation chamber delimited by a front piston movable in a front cylinder is provided on the side of the intermediate flange situated opposite the rear ventilation chamber. An actuating rod for a brake element of the braking system of the vehicle is provided on the front side of the piston. The rear piston and the front piston are in contact with one another by means of the sliding rod such that the front piston can be displaced by the rear piston.

When the vehicle is started, the rear ventilation chamber is filled with compressed air against the pressure of the preloaded spring so that the rear piston moves into the rear cylinder. The sliding rod also moves towards the rear in the intermediate flange and therefore no longer acts on the front piston. The front piston and the actuating rod can, therefore, also move toward the rear into the front cylinder, thereby releasing the brake element of the braking system. The vehicle therefore moves from a state in which it is braked by the preloaded spring to a non-braked state. If compressed air is admitted to the front ventilation chamber, the front piston can be moved in the front cylinder, as a result of which the brake element of the braking system can be acted upon by way of the actuating rod. Braking of the vehicle can thus be effected in a selective manner.

In the event of the failure of the compressed-air supply of the vehicle, the pressure of the compressed air in the rear ventilation chamber decreases. The preloaded spring then pushes the rear piston back into the starting position, the sliding rod acting on the front piston. The front piston in turn displaces the actuating rod such that the brake element of the braking system is actuated.

The above-mentioned embodiment results in a fail-safe operation of the vehicle.

The pneumatic actuators known in the prior art have a complicated design and can only be produced with difficulty. Sealing problems furthermore often occur, particularly if the pistons used have flexible membranes.

It is therefore an aim of the invention to provide an improved pneumatic actuator which can be produced in a simple manner.

According to one of the ideas underlying the invention, the intermediate flange is received in the interior of the rear cylinder or in the interior of the front cylinder. The front cylinder is fixed to the rear cylinder. This design results in considerable advantages over the pneumatic actuators known in the prior art. The actuator according to the invention can first be designed to be stackable, e.g. in one step, the rear cylinder and the components therein and, in another step, the front cylinder and the corresponding components. For the final assembly, the intermediate flange then simply has to be introduced into the rear cylinder or into the front cylinder, after which the connection between the rear cylinder and the front cylinder is established.

A reliable connection between the rear cylinder and the front cylinder can be achieved by a form-locking connection, e.g. by means of a thread-type connection or by means of a connection produced by a forming step. In particular, it is contemplated for one wall of the front cylinder and one wall of the rear cylinder to be mutually connected by means of a curled region. A shoulder is advantageously provided in one of the walls of the front cylinder or the rear cylinder, over which a region of the other cylinder is curled. Particularly durable connections between the rear cylinder and the front cylinder can be produced in this manner, and a reliable connection can be established over the entire circumference of the housing of the relevant cylinder.

One particularly advantageous embodiment of the invention is produced if the front piston or the rear piston has a substantially circular disc-shaped or ring-shaped flexible membrane connected in the region of its outer edge to the wall of the front cylinder or of the rear cylinder. In this embodiment of the relevant piston, the membrane edge is enclosed between the wall of the cylinder and the intermediate flange. A connection of this kind can be produced in a particularly simple and reliable manner by means of the pneumatic actuator according to the invention. Unlike the pneumatic actuators known in the prior art, the pneumatic actuator according to the invention can be finished and sealed in a simple manner in one step. By virtue of the fact that the wall of the rear cylinder is joined to the wall of the front cylinder, any membrane provided can be installed in a simple and particularly reliable manner, with particularly good sealing being achieved.

The production method according to the invention provides that the front cylinder is connected to the rear cylinder in a final step, wherein the front cylinder can be fixed to the rear cylinder by welding, screwing, soldering, curling and/or clamping with a sleeve.

The invention will be described in more detail by way of three embodiments illustrated in the drawings.

DETAILED DESCRIPTION OF THE DRAWINGS

Figure 1:
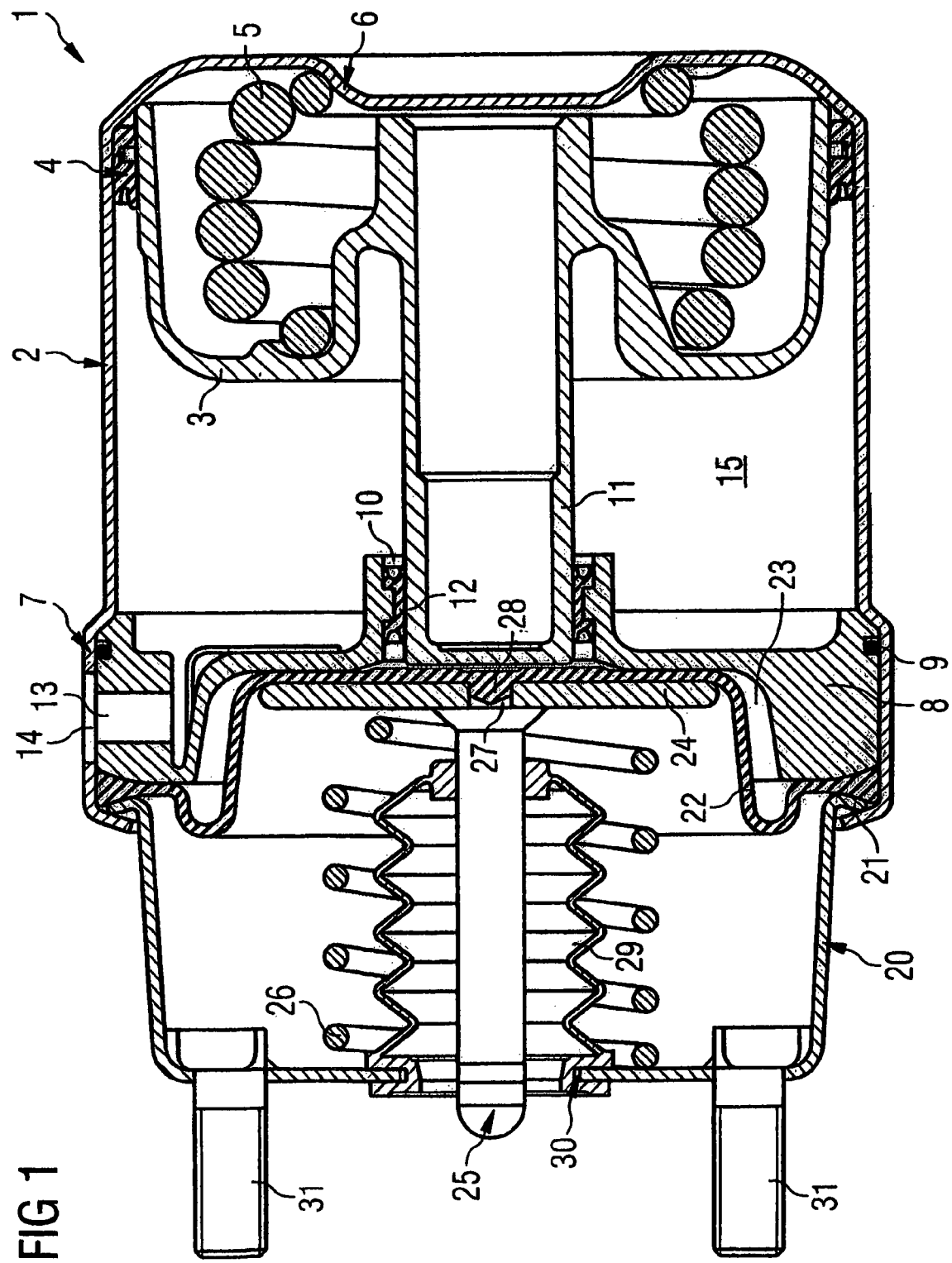
FIG. 1 is a cross-sectional view of a first spring-type brake cylinder.

FIG. 1 illustrates a cross-section through a first spring-type brake cylinder 1. The spring-type brake cylinder 1 has a pot-shaped rear cylinder 2 made of sheet steel. A rear piston 3 is provided in the rear cylinder 2 and is sealed off from the inner wall of the rear cylinder 2 by means of a circumferential seal 4. The rear piston 3 is arranged in a longitudinally displaceable manner in the rear cylinder 2. A preloaded spring 5 is provided on the rear face of the rear piston 3 and is supported in a bottom region 6 of the rear cylinder 2.

The wall of the rear cylinder 2 expands toward a receiving region 7 relative to the bottom region 6.

A circular-disc-shaped intermediate flange 8 is received in the receiving region 7 and is sealed off in an airtight manner from the receiving region 7 on its outer face by means of an O-ring 9. The intermediate flange 8 is provided in the region of its axis of symmetry with a through opening 10 in which a sliding rod 11 formed on the rear piston 3 is guided. A rubber seal 12 is introduced between the sliding rod 11 and the through opening 10 for sealing.

A ventilation hole 13 is also provided on one side in the intermediate flange 8, in the form of a radial bore in the outer edge of the intermediate flange 8. At the outlet point of the ventilation hole 13, a recess 14 is provided in the area of the receiving region 7 for the connection of a supply line. A rear ventilation chamber 15 formed by the intermediate flange 8, the rear cylinder 2 and the rear piston 3 can be supplied with compressed air by means of the ventilation hole 13, so that the rear piston 3 can be moved into the position shown in FIG. 1 against the compressive force of the preloaded spring 5.

The front cylinder 20, which is pot-shaped and made of sheet steel, adjoins the rear cylinder 2. The front cylinder 20 has a beaded fixing edge 21, which projects over the outer face of the front cylinder 20 in a shoulder-like manner. The receiving region 7 is bent over by a curling process in such a manner that the fixing edge 21 is axially secured. A circular-disc-shaped flexible rubber membrane 22, which delimits a front ventilation chamber 23 is provided between the fixing edge 21 and the intermediate flange 8. The front ventilation chamber 23 is moreover also formed by one side of the intermediate flange 8 and a region of the sliding rod 11 projecting through the intermediate flange 8.

Compressed air can be admitted selectively to the front ventilation chamber 23 by means of ventilation devices not visible in this view.

A pressure plate 24 with an actuating rod 25 extending in the region of the axis of symmetry of the first spring-type brake cylinder 1 is provided in the inner region of the rubber membrane 22. The pressure plate 24 is pressed continuously against the rubber membrane 22 by a return spring 26. A centering opening 27 provided in the pressure plate 24 receives a centering nipple 28 formed in the rubber membrane 22 so that the position of the actuating rod 25 remains within a desired region during the movement of the pressure plate 24 and the rubber membrane 22.

Expanding bellows 29 extending from an outlet opening 30 in the bottom of the front cylinder 20 to the actuating rod 25 seal off the interior of the front cylinder from dirt entering from the outside. Furthermore, two fixing bolts 31 are inserted into the bottom of the front cylinder 20 in order to fix the first spring-loaded brake cylinder 1 to a vehicle.

Particularly good sealing of the front ventilation chamber 23 is provided in the case of the first spring-type brake cylinder 1. The outer edge of the rubber membrane 22 specifically is particularly reliable and tight as a result of this design of the rear cylinder 2, of the intermediate flange 8, of the fixing edge 21 and of the edge of the membrane 22, which has a wedge-shaped cross-section in the fixing region.

The spring-type brake cylinder 1 is actuated in a known manner with compressed air being admitted to the rear ventilation chamber 15 or to the front ventilation chamber 23. A brake element (not shown in this view) of a vehicle is actuated by means of the actuating rod 25.

The first spring-type brake cylinder 1 is assembled as follows. The rear cylinder 2 is prepared in a first production step. After that, the preloaded spring 5 is inserted into the rear cylinder 2 together with the rear piston 3. The intermediate flange 8 is then inserted into the rear cylinder 2 so that it is situated in the receiving region 7. The rubber membrane 22 is then placed on the intermediate flange 8, so that its outer edge rests against the inner wall of the rear cylinder in the receiving region 7. The pressure plate 24 is then placed on the rubber membrane 22 together with the return spring 26, the front cylinder 20 finally being pressed into the receiving region 7 of the rear cylinder 2 with a constant compressive force against the pressure of the return spring 26 until it rests on the outer edge of the rubber membrane 22. In this state, the edge of the receiving region 7 projecting over the front cylinder 20 is curled so as to produce the connection between the front cylinder 20 and the rear cylinder 2 shown in FIG. 2. The edge region of the rubber membrane 22 is compressed in the longitudinal direction of the first spring-type brake cylinder 1 so as to produce a tight connection.

Figure 2:
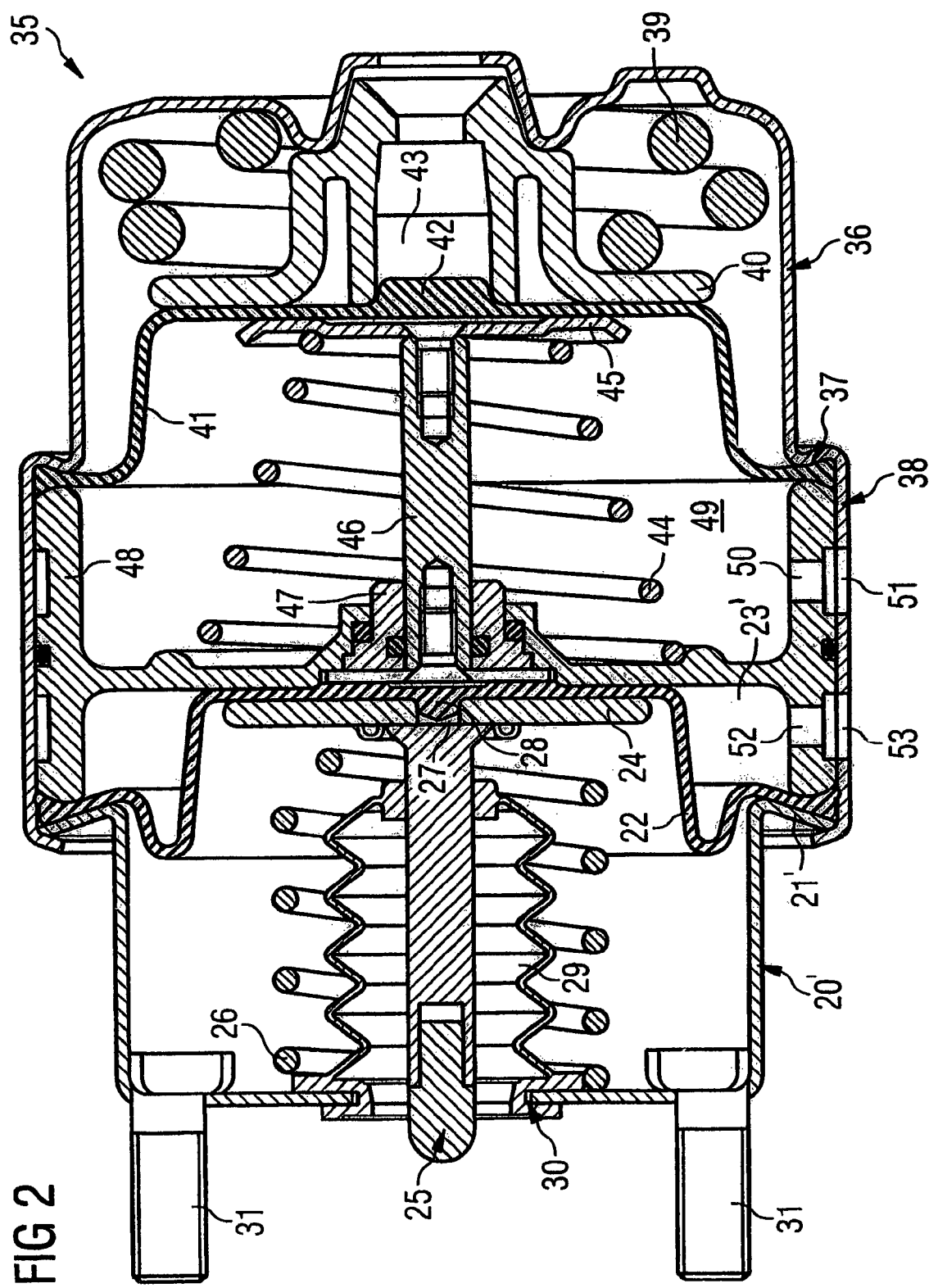
FIG. 2 is a cross-sectional view of a second spring-type brake cylinder.

FIG. 2 is a cross-sectional view of a second spring-type brake cylinder 35. The second spring-type brake cylinder 35 is comprised of a rear cylinder 36, which is pot-shaped and made of sheet steel, and a front cylinder 20' which, together with the components received therein, corresponds essentially to the front cylinder of FIG. 1. The fixing edge 21' of the front cylinder 20' has a larger diameter than the corresponding fixing edge 21 of the front cylinder 20 of FIG. 1. The rear cylinder 36 expands toward a receiving region 38 with the formation of a shoulder 37. A preloaded spring 39, which can be preloaded relative to a preloaded spring pressure plate 40 is provided on the bottom of the rear cylinder 36. A mechanical return device (not shown here) for actuating the preloaded spring pressure plate 40, by means of which the preloaded spring 39 can be compressed into the position shown in FIG. 2, is also provided.

Furthermore, an accumulator membrane 41 made of flexible material is provided in the rear cylinder 36. The accumulator membrane 41 rests by means of its outer edge with a wedge-shaped cross-section against the shoulder 37 in the receiving region 38. At its inner region, the accumulator membrane 41 engages by means of a centering cam 42 in a centering opening 43 of the preloaded spring pressure plate 40. An accumulator membrane return spring 44 presses the accumulator membrane 41 against the preloaded spring pressure plate 40 by means of an accumulator membrane plate 45. A sliding rod 46 extending in the direction of the axis of symmetry of the rear cylinder 36 is provided in a central region of the accumulator membrane plate 45. The sliding rod 46 is guided in an airtight region of an intermediate flange insert 47 which is inserted into a central opening of an intermediate flange 48. The intermediate flange 48 is in turn inserted into the receiving region 38 of the rear cylinder 36. The intermediate flange 48 clamps the accumulator membrane 41 against the shoulder 37.

Together with the accumulator membrane 41, the intermediate flange 48 forms a rear ventilation chamber 49 to which compressed air can be admitted by means of a rear ventilation hole 50 in an edge region of the intermediate flange 48 and by means of a rear recess 51 in the receiving region 38. On the sliding rod of the intermediate flange 48, together with the rubber membrane 22 in the front cylinder 20', the intermediate flange 48 forms the front ventilation chamber 23' to which compressed air can be admitted by means of a front ventilation hole 52 in the intermediate flange 48 and a front recess 53 in the receiving region 38.

The method of operation of the second spring-type brake cylinder 35 corresponds essentially to that of the spring-type brake cylinders known from the prior art. The preloaded spring 39 can be moved into the position shown in FIG. 2 by pressurizing the rear ventilation chamber 49. By admitting compressed air to the front ventilation chamber 23', the actuating rod 25 can be made to move a brake element (not shown in this view) of a braking system of a vehicle.

The second spring-type brake cylinder 35 is assembled as follows. The rear cylinder 36 is first prepared, specifically with the preloaded spring 39 and the preloaded spring pressure plate 40 inserted. Subsequently, the accumulator membrane 41 is inserted into the receiving region 38 so that its edge region is situated on the shoulder 37. The accumulator membrane plate 45, the sliding rod 46 and the intermediate flange 48 with the intermediate flange insert 47 are then inserted into the receiving region 38. The front cylinder 20' and the components contained therein, including the rubber membrane 22, are then inserted into the receiving region 38, the entire second spring-type brake cylinder 35 being compressed along its axis of symmetry by means of a tensioning device not shown in FIG. 2. The fixing edge 21' is then pressed against the shoulder 37 of the receiving region 38, with clamping of the rubber membrane 22, the intermediate flange 48 and the accumulator membrane 41. In a final step, the edge of the receiving region 38 projecting over the fixing edge 21' is curled into the position shown in FIG. 2, so that the front cylinder 20' and the rear cylinder 36 are firmly connected with one another.

Figure 3:
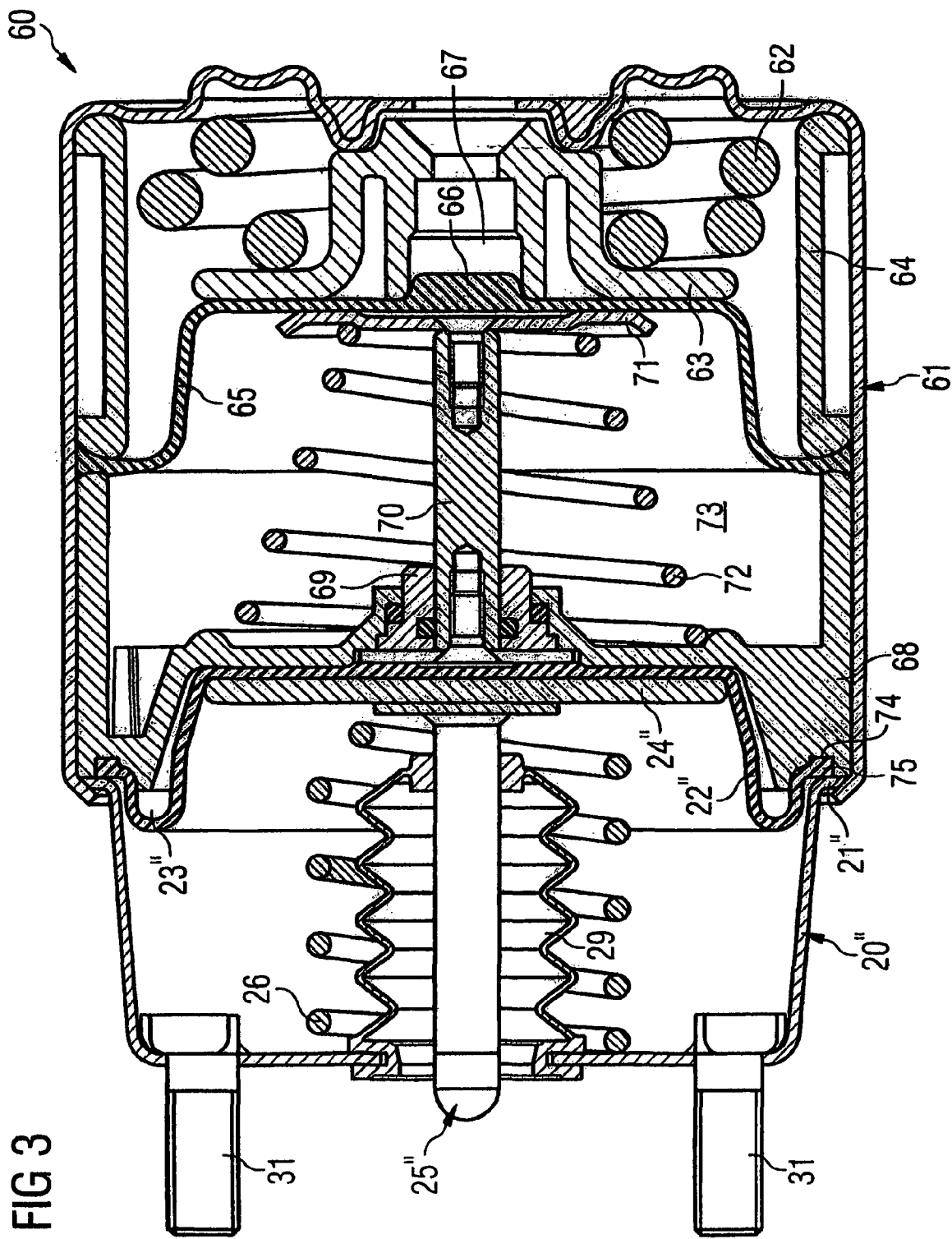
FIG. 3 is a cross-sectional view of a third spring-type brake cylinder.

FIG. 3 is a cross-sectional view of the third spring-type brake cylinder 60. The third spring-type brake cylinder 60 is comprised of a rear cylinder 61, which is pot-shaped and made of sheet steel, and a front cylinder 20" which, together with the components contained therein, corresponds essentially to the front cylinder 20 of FIG. 1.

A preloaded spring 62, together with a preloaded spring pressure plate 63, is provided in the bottom region of the rear cylinder 61. An insert ring 64 is also inserted into the rear cylinder 61 and rests against the inner wall of the rear cylinder 61. An accumulator membrane 65 extends across the rear cylinder 61 from the end of the insert ring 64 situated opposite the bottom of the rear cylinder 61. The edge of the accumulator membrane 65 has a wedge-shaped cross-section situated on the edge of the insert ring 64, provided at this point with an inclination from the inside to the outside relative to the wall of the rear cylinder 61. The accumulator membrane 65 is provided on its inner face with a centering cam 66 which engages in a centering opening 67 in the preloaded spring pressure plate 63.

An intermediate flange 68 provided on its side directed towards the accumulator membrane 65 with a region sloping downwards toward the outside relative to the wall of the rear cylinder 61 is furthermore inserted into the rear cylinder 61. This region is situated on the edge region of the accumulator membrane 65. The intermediate flange 68 is provided in its center with an intermediate flange insert 69, in which a sliding rod 70 is movably guided. The sliding rod 70 is provided on its side directed toward the bottom of the rear cylinder 61 with an accumulator membrane plate 71. An accumulator membrane return spring 72 extends between the accumulator membrane plate 71 and the intermediate flange 68. A rear ventilation chamber 73, to which compressed air can be admitted by means of ventilation devices not shown in this view, is formed between the accumulator membrane 65 and the intermediate flange 68.

A circumferential ring-shaped rubber membrane groove 74 is formed in the intermediate flange 68 in a region situated close to the inner wall of the rear cylinder 61 on the side opposite the rear ventilation chamber 73. A thickened outer edge region 75 of the rubber membrane 22" is inserted into the rubber membrane groove 74. The outer edge region 75 is pressed into the intermediate flange 68 by a fixing edge 21" of the front cylinder 20". The front ventilation chamber 23", to which compressed air can be admitted by means of ventilation devices not shown in this view, is formed between the rubber membrane 22" and the intermediate flange 68. A front pressure plate 24" connected to an actuating rod 25" projecting from the front cylinder 20" rests against the rubber membrane 22".

The third spring-type brake cylinder 60 operates in essentially the same manner as the spring-type brake cylinders known in the prior art, i.e., by admitting compressed air to the rear ventilation chamber 73 and to the front ventilation chamber 23". A brake element (not shown in this view) of a braking system of a vehicle can be actuated by the movable actuating rod 25".

The third spring-type brake cylinder 60 is assembled as follows.

The rear cylinder 61 is prepared in a first production step. The preloaded spring 62, the insert ring 64, the preloaded spring pressure plate 63 and the accumulator membrane 65 are inserted one after the other into the rear cylinder 61. Subsequently, the accumulator membrane plate 71, the accumulator membrane return spring 72 and the intermediate flange 68, together with the intermediate flange insert 69 and the sliding rod 70, are inserted until they are situated in the position shown in FIG. 3. Then, the rubber membrane 22" is inserted in such a manner that its outer edge region 75 is situated in the rubber membrane groove 74. Finally, the front cylinder 20" is inserted into the rear cylinder 61. The third spring-type brake cylinder 60 is compressed on the whole in its longitudinal direction by means of a tensioning device not shown in this view, so that the rubber membrane 22" is pressed firmly into the rubber membrane groove 74 by means of its outer edge region 75. Moreover, the outer edge region of the accumulator membrane 65 is compressed between the intermediate flange 68 and the insert ring 64. In this state, the projecting edge of the rear cylinder 61 is curled around the fixing edge 21" of the front cylinder 20" in such a manner that a firm connection is established between the front cylinder 20" and the rear cylinder 61.

In other embodiments not shown here, the arrangement of the front cylinder and the rear cylinder is reversed, so that essentially all of the components are first inserted into the front cylinder. Finally, the rear cylinder is then fitted to the front cylinder, after which a connection is established between the front cylinder and the rear cylinder. The connection between the front cylinder and the rear cylinder can also be accomplished, in particular, by means of a thread-type connection, by means of a clamping bar or by means of a clamping sleeve. The front cylinder and the rear cylinder can also be mutually connected according to the invention by electric welding.

The invention claimed is:

1. Pneumatic actuator for a braking system of a vehicle, comprising:
    a rear cylinder in which a rear piston is displaceably arranged, one side of the rear piston and an inner wall of the rear cylinder forming a rear ventilation chamber;
    a preloaded spring provided on the other side of the rear piston;
    a front cylinder in which a front piston having a rubber membrane is movably arranged, a rear side of the front piston forming part of a front ventilation chamber;
    an actuating rod for a brake element of the braking system provided on a front side of the front piston;
    a sliding rod by way of which the rear piston and the front piston are in mutual contact such that the front piston is displaceable by the rear piston;
    an intermediate flange provided in a region between the front cylinder and the rear cylinder, the intermediate flange being penetrated by the sliding rod;
    wherein, prior to assembly of the pneumatic actuator,
        the intermediate flange is separate from the front cylinder and the rear cylinder, at least one of the front cylinder and the rear cylinder is arranged to receive the intermediate flange against a supporting surface which limits an axial location of the intermediate flange to a predetermined depth, and wherein, when assembled, the intermediate flange is completely received in an interior of one of the rear cylinder and the front cylinder, the front cylinder and the rear cylinder are form-lockingly connected with one another with an outer membrane edge of the rubber membrane captured between the intermediate flange and an interior surface of at least one of the front cylinder and the rear cylinder at the connection of the front and rear cylinder, and only one housing connection between the rear cylinder and the front cylinder holds the intermediate flange and the membrane within the brake actuator while connecting the rear cylinder with the front cylinder.

2. Pneumatic actuator according to claim 1, wherein a wall of the front cylinder and a wall of the rear cylinder are mutually connected via a curled region of one wall with a shoulder of the other wall.

3. Pneumatic actuator according to claim 2, wherein the rubber membrane of the front piston has an essentially circular-disc-shaped or circular-ring-shaped flexible construction, and is connected in the region of its outer membrane edge with the wall of the front cylinder, the outer membrane edge being enclosed between the wall of the front cylinder and the intermediate flange.

4. Pneumatic actuator according to claim 3, wherein the rear piston has an essentially circular-disc-shaped or circular-ring-shaped flexible membrane, which is connected in a region of its outer membrane edge with the wall of the rear cylinder, the outer membrane edge being enclosed between the wall of the rear cylinder and the intermediate flange.

5. Pneumatic actuator according to claim 4, wherein the actuator is a spring-type brake cylinder.

6. Pneumatic actuator according to claim 2, wherein the rear piston has an essentially circular-disc-shaped or circular-ring-shaped flexible membrane, which is connected in a region of its outer membrane edge with the wall of the rear cylinder, the outer membrane edge being enclosed between the wall of the rear cylinder and the intermediate flange.

7. Pneumatic actuator according to claim 1, wherein the rubber membrane of the front piston has an essentially circular-disc-shaped or circular-ring-shaped flexible construction, and is connected in the region of its outer membrane edge with the wall of the front cylinder, the outer membrane edge being enclosed between the wall of the front cylinder and the intermediate flange.

8. Pneumatic actuator according to claim 7, wherein the rear piston has an essentially circular-disc-shaped or circular-ring-shaped flexible membrane, which is connected in a region of its outer membrane edge with the wall of the rear cylinder, the outer membrane edge being enclosed between the wall of the rear cylinder and the intermediate flange.

9. Pneumatic actuator according to claim 1, wherein the rear piston has an essentially circular-disc-shaped or circular-ring-shaped flexible membrane, which is connected in a region of its outer membrane edge with the wall of the rear cylinder, the outer membrane edge being enclosed between the wall of the rear cylinder and the intermediate flange.

10. Pneumatic actuator according to claim 1, wherein the actuator is a spring-type brake cylinder.

11. Method of assembling a pneumatic actuator for a braking system of a vehicle, the method comprising the acts of:

a) providing a rear cylinder having an open end;
b) introducing a preloaded spring into the rear cylinder through the open end;
c) introducing a rear piston into the rear cylinder through the open end so as to capture the preloaded spring between the rear piston and a closed end of the rear cylinder;
d) completely introducing an intermediate flange, distinct from a front cylinder and the rear cylinder, into the rear cylinder through the open end after introducing the rear piston; and
e) after introducing the intermediate flange, fixing the front cylinder, in which a front piston with an actuating rod for a brake element of the braking system is movably arranged, to the rear cylinder while enclosing an edge of a flexible membrane of the front piston between the intermediate flange and an interior surface of at least one of the front cylinder and the rear cylinder at the connection of the front and rear cylinder to form a seal therebetween, the rear cylinder and the front cylinder being in contact with one another after the fixing via a sliding rod passing through the intermediate flange, the front piston being displaceable by the rear piston, and holding the intermediate flange and the membrane within the brake actuator while connecting the rear cylinder with the front cylinder with only one housing connection between the rear cylinder and the front cylinder.

12. Method according to claim 11, wherein the fixing operation in act e) is carried out by at least one of welding, screwing, curling, and clamping with a sleeve.

13. Method of assembling a pneumatic actuator for a braking system of a vehicle, the method comprising the acts of:

a) providing a rear cylinder having an open end;
b) introducing a preloaded spring into the rear cylinder through the open end;
c) introducing a rear piston into the rear cylinder through the open end so as to capture the preloaded spring between the rear piston and a closed end of the rear cylinder;
d) providing a front cylinder in which a front piston with an actuating rod for a brake element of the braking system is movably arranged;
e) completely introducing an intermediate flange, distinct from the front and rear cylinders, in an interior of one of the rear cylinder and the front cylinder through an open end of the cylinder;
f) after introducing the intermediate flange, fixing the front cylinder to the rear cylinder, while enclosing an edge of a flexible membrane of the front piston between the intermediate flange and an interior surface of at least one of the front cylinder and the rear cylinder at the connection of the front and rear cylinder to form a seal therebetween, the rear cylinder and the front cylinder being in contact with one another after the fixing via a sliding rod passing through the intermediate flange, the front piston being displaceable by the rear piston, wherein only one housing connection between the rear cylinder and the front cylinder holds the intermediate flange and the membrane within the brake actuator while connecting the rear cylinder with the front cylinder.

14. Method according to claim 13, wherein the fixing operation in act f) is carried out by at least one of welding, screwing, curling, and clamping with a sleeve.

* * * * *